May 16, 1939. S. G. STUCKEY 2,158,708
ADJUSTABLE SHEARS
Filed Nov. 29, 1935 3 Sheets-Sheet 1
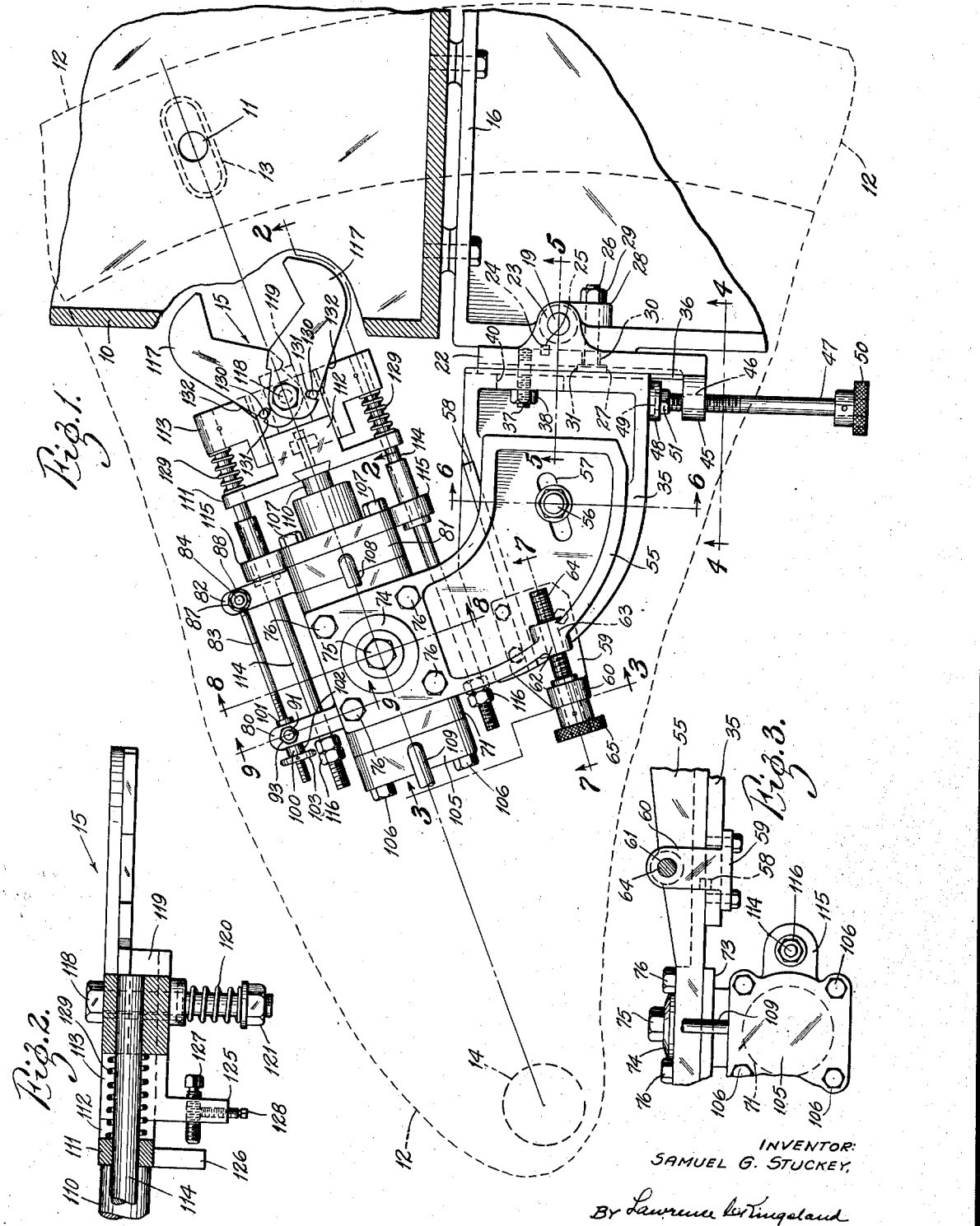
INVENTOR:
SAMUEL G. STUCKEY,
By Lawrence C. Kingsland
ATTORNEY.

INVENTOR:
SAMUEL G. STUCKEY.
By Lawrence C. Kingsland
ATTORNEY.

May 16, 1939.    S. G. STUCKEY    2,158,708
ADJUSTABLE SHEARS
Filed Nov. 29, 1935    3 Sheets-Sheet 3
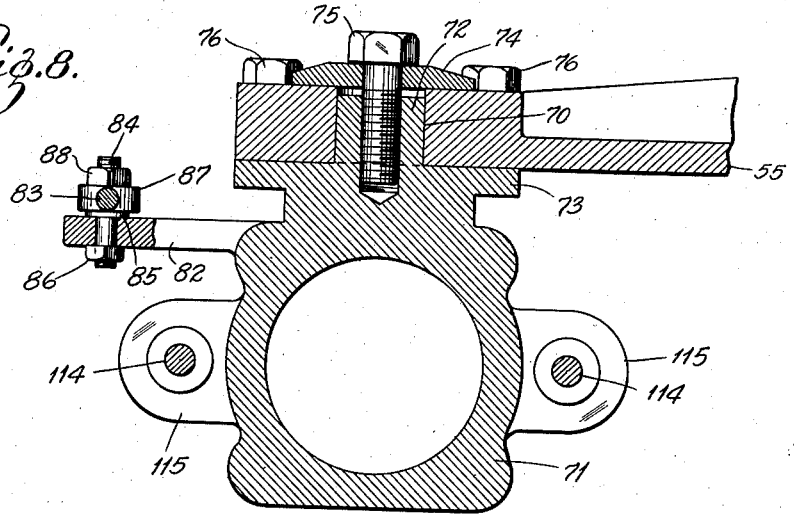
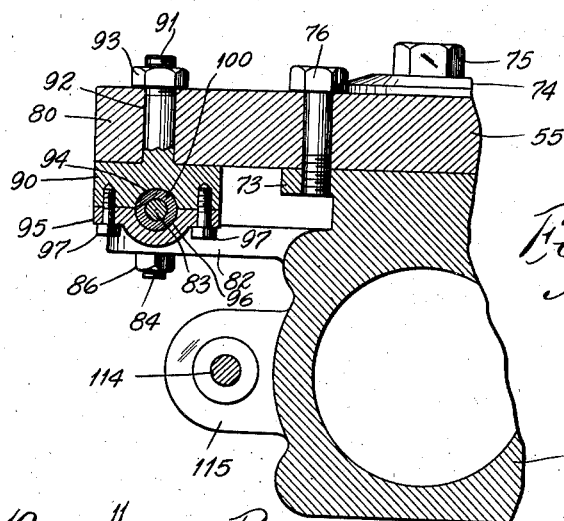
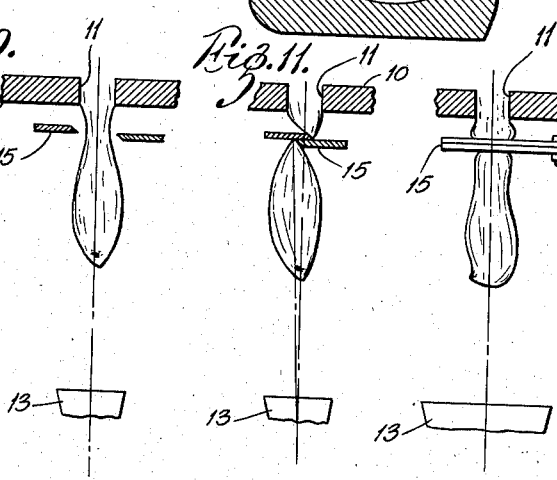
INVENTOR:
SAMUEL G. STUCKEY.
By Lawrence C. Kingsland
ATTORNEY.

Patented May 16, 1939

2,158,708

UNITED STATES PATENT OFFICE

2,158,708
ADJUSTABLE SHEARS

Samuel G. Stuckey, Affton, Mo., assignor to Obear-Nester Glass Company, St. Louis, Mo., a corporation Application November 29, 1935, Serial No. 52,181

6 Claims. (Cl. 49—14)

This invention relates to glass cutting shears and it provides means for closely adjusting the shears to the proper point of cut and likewise provides shears of this type that are so operated as to cause the mass of glass cut off to be deformed in the proper direction relative to the molds into which the gob of glass passes.

Glass cutting shears as generally found are of the type having two opposing relatively movable blades, the one reciprocating across the other, or swinging across the other by pivotal action. Necessarily, since the blades must have some thickness, and since the glass is molten and soft, the striking of the blades on opposite sides of the mass of glass produces a squeezing or transverse deformation of the portion severed at and adjacent the point of shear, bringing the end of the glass to almost an edge. The resulting gob of glass is frequently found to have not only a reduced transverse dimension adjacent the point of cut—which dimension may conveniently be referred to as minor axis; but also has an extenuated transverse dimension at right angles to the minor axis—this last dimension may be designated major axis. A view of the gob from its flattened side discloses somewhat pointed flanges turned out at the sides thereof adjacent the sheared end, along the narrowed faces or sides of the gob, these flanges being made up of glass that was squeezed out by the shear blade action.

The deformation above mentioned occurs similarly on the end of the glass from which the gob has been severed, which end projects from the forehearth. As a matter of fact, the deformation is apt to be more pronounced on such ends than on the upper surface of the gob, since the weight of the gob tends to draw it out and away from the shears, thus reducing the deformations.

In many operations the feeder does not withdraw this projecting end back into the forehearth, or only partially so. In such cases the deformations will appear on the bottom of a subsequent gob.

Normally the gobs of glass pass from the feeder, after being sheared, into molds. For example, they may drop through a funnel into a parison mold. If the object being molded has a transverse cross section that is elongated, it is important that the major transverse axis of the mold align with the major axis of the bottom or entering end of the gob. If the axes do not align, the forming of the glass in the mold produces folds, or lines in the finished object. To illustrate, suppose the major axis of the gob is so far misaligned as to coincide with the minor axis of the mold, then as the glass drops through the funnel into the mold, the necessary constriction of the gob by the edges of the mold causes the extra quantity comprising the flanges on the gob previously referred to, to roll over into the sides of the gob. Since by this time the gob is surrounded with a chilled film, generally called "enamel", these rolled over flanges will not fuse into the remaining glass, but will form indentations in the enamel in which they rest. It will be understood that the same effect, to a greater or less degree, will occur when the major axis of the gob falls between the major and minor axes of the mold.

However, when the major axes of gob and mold are aligned, not only is the above difficulty eliminated, but also the extra quantity of glass found in the flanges, or disposed along the longer major axis, acts to fill up the longer space along the major axis of the mold.

Hence it is apparent that it is important that the major axis of the gob align with the major axis of the mold.

It is therefore an object of this invention to provide means for properly aligning the major axis of a gob with the major axis of mold.

To the attainment of this object, this invention comprehends the locating of the shears of a glass cutting device so that the general direction of compressive forces produced thereby are aligned with the minor axis of the mold.

It is a further object to provide a mechanism of this kind wherein the relative position of shear and mold is adjustable.

It is a further object to provide means for adjusting the shears angularly relative to the mold, and relative to the glass outlet.

It is a further object to provide means for reciprocably adjusting the shears relative to the glass outlet, with respect to horizontal, and vertical, positions.

Further objects include specific mechanisms whereby the above objects are attained.

In the drawings:

Fig. 1 is a plan view of the shear device as applied to a forehearth shown partly in section.

Fig. 2 is a section on the line 2—2 of Fig. 1.

Fig. 3 is a section on the line 3—3 of Fig. 1.

Fig. 8 is an enlarged section on the line 8—8 of Fig. 1.

Fig. 9 is a section on the line 9—9 of Fig. 1.

Figs. 10–12 are illustrations of a gob of glass in successive stages of shearing, showing shear effect. Figs. 11 and 12 are taken at right angles to each other.

Figure 4:
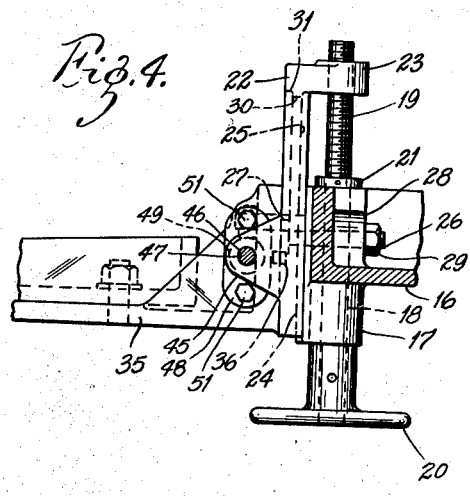
Fig. 4 is a section on the line 4—4 of Fig. 1.
Figure 5:
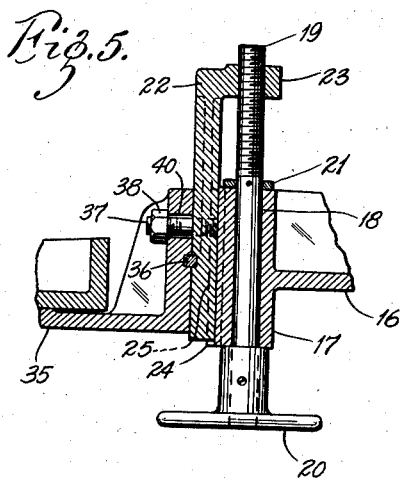
Fig. 5 is a section on the line 5—5 of Fig. 1.

In Figs. 10, 11 and 12 of the drawings, are shown representative shapes of a gob of glass being discharged from the orifice 11, by any conventional forming means. In Fig. 10 the gob is shown to have necked in adjacent the shears, preparatory to being cut. Fig. 11 discloses the effect of the shears as viewed along the major axis, or along the line at which the shear blades cross. The effect of overlapping the shear blades, in displacing the gob is shown, as is the squeezing effect thereof, that causes the upper end of the gob to be shaped almost to an edge. Likewise the edge produced on the glass projecting from the forehearth above the shears is shown. In this figure and Fig. 10, this last named edge is shown to be present on the bottom of the gob, having resulted from the previous cut.

In Fig. 12, a view at right angles to Fig. 11 is given. This view is taken along the minor axis of the ends of the gob. The flattened ends, with the flanges, are shown. Referring to the lower part of the gob, it is seen that the flanges are displaced upwardly from a rounded bottom. This result obtains because fresh glass was forced into the projection after the previous shearing, to produce the gob, and this glass stretched the enamel on the projection.

In Fig. 1, 10 indicates a forehearth shown somewhat diagrammatically, the forehearth having an outlet orifice 11 in the bottom thereof through which the gob of glass may be extruded by suitable feeding mechanism, as is well known in the art. A forming machine is illustrated at 12. The forming machine includes a movable table or other support upon which are mounted molds. Such molds are shaped to a suitable formation, and usually are divided into two separable sections. In the present case, the molds in use may be considered as being elongated in transverse cross section.

Although any means of conveying the severed gob of glass from the forehearth to the mold is contemplated in the present invention, for illustration the gob is shown as following from the forehearth into an elongated funnel 13, the major axis of which is aligned with the major axis of the mold.

In the type of forming machine herein disclosed, the table holding the molds is mounted on a vertical axis of rotation 14, and several molds are located around the periphery of the table. The radius of the table is such as to bring each mold successively beneath the orifice 11, to receive a severed gob of glass. The radius of the table, and the location of its vertical axis are variable, but obviously must be so arranged that the circle upon which the molds are mounted intersects a vertical line dropped from the forehearth orifice. In the present forming machine, it may be assumed that the major axes of the molds are radial to the pivot 14. When one mold on the table is charged, the table is rotated to bring a subsequent one beneath the orifice.

The shears generally indicated at 15 are located beneath the orifice 11 in position to cut off an extruded gob of glass suspended below the orifice. It will be understood that the operation of the shears is properly timed relative to the operation of the feeder mechanism.

The shear mounting includes a support 16 bolted to the forehearth or to any suitable support. Adjacent one edge, the support 16 is provided with a boss 17 (Fig. 4). This boss has a vertical bore 18 therein, in which bore 18 operates an adjusting screw 19 having a handle 20 thereon. A collar 21 is pinned onto the screw 19 to support the screw and prevent its withdrawal.

A sliding frame 22 has an offset 23 that is threaded to receive the adjusting screw 19. It will be seen that operation of the handle 20 adjusts the vertical position of the frame 22. A key 24 holds the frame 22 in proper alignment. This key is fastened to the boss 17 and operates in a key-way 25 in the frame 22. A locking screw 26 has a head 27 that engages against the back side of the frame 22. The stem of the screw extends through the wall of the support 16 and the boss 28 formed thereon. A nut 29 is employed to fix the screw and bind the frame 22 to the support 16. A vertical slot 30 in the frame 22 is provided to accommodate for the screw 26 during vertical adjustment of the frame 22 relative to the support 16. The slot 30 extends all the way through the frame 22 and is provided with a widened portion 31 to accommodate the head 27 of the screw 26, the head having flattened sides to engage the walls of the slot at 31 and prevent rotation of the screw.

Mounted for horizontal sliding movement in the frame 22 is a plate 35. A key 36 operates in suitable key-ways in the frame 22 and the plate 35 and guides the latter in its horizontal movement. A screw 37 is threadedly fixed at one end in the frame 22. At the other end, it extends through the upturned end flange on the plate 35. This end likewise is threaded, and the nut 38 engages around this last named end. A horizontal slot 40 is provided in the flange of the plate 35 to accommodate the screw 37 during the horizontal movement of the plate. When the plate is properly adjusted, the nut 38 is tightened, which binds the plate 35 to the frame 22 and holds the plate thus in position. The screw 37 also assists in supporting the plate 35.

Figure 6:
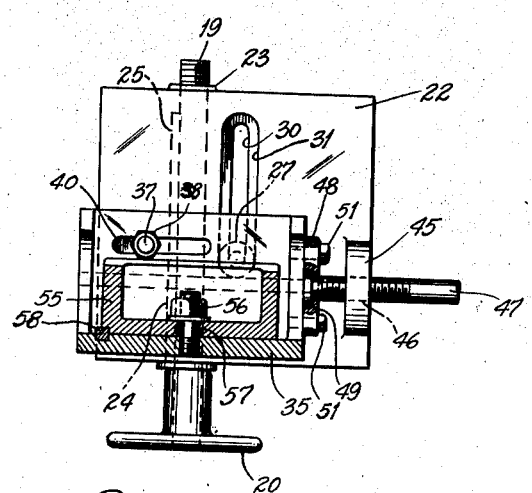
Fig. 6 is a section on the line 6—6 of Fig. 1.
Figure 7:
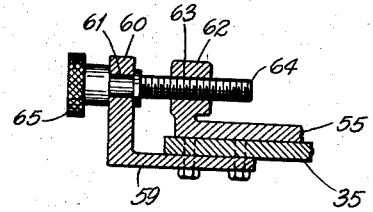
Fig. 7 is a section on the line 7—7 of Fig. 1.

Extending laterally from the frame 22 is a boss 45. This boss has an internally threaded bore 46 through which a horizontal screw 47 engages. A hollow extension 48 is secured to the plate 35. In the extension 48 is housed the head 49 of the screw 47. The screw 47 is likewise provided with an operating handle 50. It will be understood that rotation of the handle 50 threads the screw 47 into or out of the boss 45 and by means of the engagement of the head 49 within the hollow extension thereof, the plate 35 is moved horizontally across or back on the frame 22. The hollow extension is shown in Fig. 6 and is seen to be removably attached to the flange on plate 35 by means of suitable screws 51.

The plate 35 extends laterally outward from the support 16. Slidably mounted on the top surface of the plate is an arm 55. This arm is supported on the plate by means of a suitable nut and screw arrangement 56 extending through the plate 35 and through a slot 57 in the arm 55. A washer may be provided between the nut and the arm 55. The slot 57 permits relative adjustment between the arm 55 and the plate 35. A key 58 fits into suitable key-ways in the plate 35 and the arm 55 and directs the adjustment. Secured to the under surface of the plate 35 is an angle 59 having a vertical portion 60 in which there is an opening 61. The arm 55 is provided with a boss 62 having a threaded bore 63 therethrough aligned with the opening 61 in the leg 60 of the angle 59. An adjusting screw 64 is rotatably mounted in the opening 61 and provided with collars to prevent axial movement of the screw relative to the angle iron. The outer end of this screw 64 is threaded through the opening 63 in the boss 62. A handle 65 is provided for rotating the screw. It will be seen that when the nut 56 is loosened slightly, the handle 65 may be rotated to adjust the arm 55 across and back on the plate 35 in a direction of movement controlled by the key 58. As will be pointed out hereafter, this direction of movement is parallel to the ultimate major axis of the gob of glass severed.

The outer portion of the arm 55 is flattened on both its upper and lower surfaces and has a circular opening 70 therethrough. An air cylinder 71 has a circular boss 72 extending from the top thereof and which fits into the bore 70. The boss 72 extends upwardly from the flange 73 but terminates short of the top surface of the arm 55. A washer 74 spans across the top of the bore 70 and supports a screw 75 threaded into the cylinder 71. It will be seen that tightening the screw 75 draws the boss 72 into the bore and forces the flange 73 to bind the cylinder into position. As will be pointed out, this provides for a swinging adjustment of the shears.

In order to hold the cylinder in one position of adjustment, a plurality of screws 76 engage through the arm 55 and may be threaded into the flange 73 of the cylinder 71. The purpose of this fixed position will be explained hereinafter.

In order to effect a close adjustment of the cylinder about the arm 55, the arm is provided with an extension 80 at its outer end. On a portion of the cylinder 71, such as the cylinder head 81, is an extension 82. Between these extensions 80 and 82 is an adjusting screw 83 designed in the manner to be described.

Upstanding from the extension 82 is a stud 84 having a shoulder 85 that rests upon the extension 82, the stud being of reduced diameter on either side of the shoulder. The stud extends through the extension 82 and may be secured thereto by a nut 86. Around the upper end of the stud 84 is fitted a collar 87 pivotable about the stud to a proper position of adjustment and adapted to be held in such position by a nut 88. To this collar 87 is fixed, integrally or otherwise, the adjusting screw 83. This adjusting screw 83 extends back beneath the extension 80 on the arm 55.

To the underside of the extension 80 is secured a plate 90 having a screw 91 integrally formed therewith, which screw extends through a suitable opening 92 in the extension 80 and may be rotated therein. A nut 93 on the upper side of the extension 80 may be tightened down to hold the screw 91 in fixed position of rotation. The plate 90 has a semi-circular depression 94 therein. A plate 95 having a complementary semi-circular depression 96 therein is bolted to the plate 90 by means of screws 97. Within the circular opening formed by the complementary recesses 94 and 96 is seated an internally threaded rotatable sleeve 100. This sleeve receives the adjusting screw 83. The sleeve is provided with integral shoulder elements 101 and 102 that abut the opposite edges of the united plates 90 and 95. By this means, the sleeve may be rotated by its handle 103 without axial displacement, and will axially displace the adjusting screw 83.

In operating this adjustment feature, necessarily the nuts 86 and 93 are loosened somewhat prior to operating the hand wheel 103. The stud 84 and screw 92 form pivots by their close fits in extensions 82 and 80, respectively.

The cylinder 71 is provided with the aforementioned cylinder head 81 at one end and with a similar cylinder head 105 at the other end. The cylinder head 105 is held on by means of suitable screws 106. The cylinder head 81 is held in place by suitable bolts 107. The head 81 is provided with an air connection 108 and the head 105 is provided with an air connection 109. It will be understood that these air connections supply or exhaust air from the respective ends of the cylinder. Reciprocating within the cylinder under the action of air supply, through the aforementioned connections, is a piston of any suitable character to which is connected a piston rod 110. Secured to this piston rod 110 is a cross head 111.

As the shears themselves do not form any part of this invention outside of the combination, detailed explanation of them need not be given. Generally, however, it will be seen that the cross head 111 has an extension 112 thereon sliding in a channel groove in the shear head 113. The sheer head has rods 114 fixed thereto, the rods extending back through and, reciprocably bearing in, the cross head 111 and suitable extensions 115 on the cylinder head 81. Each of these sliding rods is provided with nuts 116 threaded thereon to limit outward movement of the shear head 113 and provide an adjustment for this limit. One of these nuts comprises a lock nut. The shear blades 117 are pivoted on a screw 118 secured to an upstanding boss 119 on the shear head 113. This boss 119 stands up in the middle of the channel in the shear head 113. The extension 112 of the cross-head 111 is bifurcated at its outer end, so as to straddle the boss 119. The screw 118 extending through the shear blades 117, and the boss 119, is surrounded at its lower end by a spring 120. A nut 121 holds these parts in place, the spring providing a flexible mounting for the shear blades that acts to compensate for wear.

The shear head 113 has a depending portion 125 thereon. In suitable relation thereto is an element 126 secured to the crosshead 111. An adjusting screw 127, held in suitable adjusting position by a lock screw 128, adjusts the relative positions of the cross head and the element 112. As has been noted, the element 112 is slidably mounted in the shear head 113. Springs 129 surrounding the rods 114 act to separate the crosshead 111 and the shear head 113.

Upstanding pins 130 are secured to the bifurcations of the extension 112. These engage in slots 131 in the respective shear blades. By this means the shear blades may be closed. As will be shown, the normal open position of the blades is limited by their striking the corners 132 on the shear head 113.

The operation of this shear mechanism is as follows: referring to Fig. 1, application of air through the air supply 109 forces the air piston and the rod 110 to the right, carrying the cross head 111 therewith, they being secured together. Owing to the action of the springs 129, the shear head 113 will likewise be moved in this process until the nuts 116 strike the cylinder head extensions 115. This point is adjusted by the nuts 116 so that the shear blades 117 are properly located beneath the orifice 11.

When the nuts 116 thus engage the cylinder head extension 115 outward movement of the shear head 113 ceases. In view of the fact that the shear blade pivot 118 is mounted on the shear head 113, the boss 119 being integral therewith, it likewise stops moving. Further outward movement of the cross head 111 then acts to compress the springs 114, there being thus relative movement between the cross head 111 with its extension 112, and the shear head 113. As the pins 130 are carried by the extension 112, they are moved outwardly relative to the shear head, the boss 119, and the blade pivot 118. These pins 130 by their association in the slots 131 close the shear blades 117 and sever the glass suspended from the orifice 11. The shear blades in closing overlap, causing the lateral displacement of the severed gob, as heretofore mentioned. The displacement varies with the amount of overlap. The adjusting screw 127 forms a limit to the movement of the cross head 111 relative to the shear head 113, thus stopping the movement of the former, after a given amount of travel. Therefore this adjusting screw controls the blade overlap.

The operation of the device as a whole is as follows:

The forming machine 12 is set up in the desired location relative to the forehearth 10 with the molds represented by funnels 13, adapted to come beneath the orifice 11.

The shears are generally assembled with all the parts secured together in tentative position. The frame 22 is now mounted over the key 24 and the adjusting screw 19 is threaded into the projection 23. The screw 26 is set in place through the slot 30 and the nut 29 turned down to hold the screw. The plate 35 is then engaged over the key 36 with the screw 37 passing through the slot 40. The nut 38 is then threaded over the screw 37.

The horizontal adjusting screw is slipped through the bore 46 in the frame 22, the retaining plate 48 having previously been engaged over the head 49. The handle 50 is then pinned on to the screw 47 and the retaining plate 48 is secured to the plate 45 by means of the screws 51.

The arm 55 is then located over the plate 35 and the key 58. The screw 56 will slip through the slot 57 and the nut turned down over the screw. The adjusting screw 64 is then engaged through the boss 62 and the handle 65 pinned thereto.

The shear cylinder 71 is then put into position with the circular boss 72 slipped into the bore 70 on the other end of the arm 55. The washer 74 is then set into place and the screw 75 inserted to hold the cylinder to the arm. It will be understood that the entire shear unit is previously assembled. The adjusting screw 83 is then engaged on the pin 84 and the two nuts 86 and 88 threaded onto the pin 84. This pin then projects back beneath the projection 80 on the arm 55. The plate 90 is set into proper position and held onto the extension 80 by the nut 93. The sleeve 100, with the handle 103 thereon, is threaded over the adjusting screw 83 to the proper position and then slipped into the semi-circular groove 94 within the plate 90. Complementary plate 95 is then located over the sleeve 100 and secured in place by the screws 97.

It is preferable that the line of advance of the shear piston be on a line radial to the forming machine table as has been described. Where a uniform location of the forming machine, relative to the forehearth is being employed, the angle between the line joining the center of the forming machine table and the center of the forehearth would also be uniform in its angularity to some given horizontal line, such as the end of the forehearth. As this may not vary, the screws 76 are provided to fix the relative angularity of the shear unit relative to the arm 55. These screws 76 will then hold the shear unit in proper position for this uniform arrangement of the mechanisms.

Hence the screws 76 may be set in position and then turned down tight. Necessarily the adjusting screw 83 will have to be located suitably for this position. With the shears thus located, the vertical adjusting screw 19 is turned by its handle 20 to obtain the proper distance between the orifice 11 and the shear blades, as the characteristics of the gob are varied by varying this distance.

Next the horizontal adjusting screw 47 is operated by its handle 50 to displace the shear in it so that the axis of the piston will not be horizontally displaced but will align with the line between the centers of the forming machine pivot or axis and the forehearth orifice. Of course, if desired, the shears may be displaced a suitable distance from this line, such as to allow for lateral displacement of the gob caused by the overlap.

It will be understood that in all of these adjustments the several lock nuts are loosened to permit the relative movement and then tightened after the adjustment is completed.

Next the adjusting screw 65 is operated. This produces longitudinal movement axially of the piston rod with the screw 76 in place. This is necessary because the stroke of the piston is limited and its operation must carry the shear blades under the orifice. Furthermore, the shears may be employed which do not advance in this manner, the blades remaining fixed and not advancing to the orifice before they closed.

The nuts 116 are then set to provide a final adjustment limiting the advancement of the shears underneath the forehearth orifice. Following this, the adjusting screw 127 is fixed in the proper position to obtain the desired degree of overlap. This overlap varies with the character of the work being done and will be varied in accordance with the other adjustments so that the gob will fall into the funnel 13 for severing. This overlap control also provides a compensation for wear on the shear blade edges. As the blades are repeatedly ground, their edges retract. This may be compensated for by permitting the blades to close further.

When the relative positions of the forming machine and the forehearth are varied, in order to preserve the alignment of the major axis of the gob and the major axis of the mold, the shears must be pivoted. To accomplish this, the screws 76 are removed, the screw 75 is then loosened sufficiently to permit rotation of the cylinder 71 relative to the arm 55. The nuts 93 and 84 are then loosened. Following this, the adjusting handle 103 can be turned and by the adjusting screw 83 the cylinder 71 may by swung relative to the arm 55. When the shear unit is properly aligned, the nuts 88 and 93 are again tightened to secure the parts in this position of adjustment.

It will be seen that a shear mechanism has been provided that properly positions a gob relative to the mold. The shear further provides means for adjusting the blades relative to the forehearth both vertically and horizontally. Since the horizontal adjustment is in two directions, the device moves universally. Likewise the shear unit may be pivoted so that the line of the direction or closing of the blades is perpendicular to the major axis of the gob and more particularly may be made perpendicular to a radial line emanating from the center in the forming machine. Furthermore in this combination, the degree of overlap of the blades can be adjustingly controlling the displacement of the gob by the lower plate.

The invention having been described, what is claimed is:

1. In a device of the kind described, a glass discharge mechanism, a base, shears having oppositely moving blades for severing glass emitted from said discharge mechanism, a forming machine having a rotatable support, a plurality of forming devices on said support and adapted to be successively brought beneath the glass discharge mechanism to receive a charge of glass severed by said shears, said forming devices being of elongated transverse section, the major axes of which are radial to said rotatable support, and means mounting said shears on said base so that the direction of movement of said blades is transverse to the major axis of the forming device then in charge receiving position.

2. In a device of the kind described, a glass discharge mechanism, a base member, a cutting member for severing glass from said discharge mechanism, and means mounting said cutting member on said base member, said means including a circular boss upstanding from one of said members and an opening on the other member to receive said boss, and means for drawing the two members together to hold them in adjusted position.

3. In a device of the kind described, a glass discharge device, a cutting mechanism, a frame, means movably mounting the frame on the glass discharge device, a plate, means movably mounting the plate on the frame, an arm, means movably mounting the arm on the plate, and means mounting the cutting mechanism on the arm, each of the aforesaid movements being in a different direction.

4. The method of controlling the depositing of glass gobs into molds having a cross-section including a major axis comprising locating a mold having a cross-section including a major axis beneath the orifice of a glass discharge mechanism, and thereafterwards adjusting a shear mechanism disposed adjacent said glass discharge mechanism so that the shear blades move in closing and opening along a path substantially at right angles to the major axis of the mold so that a severed gob will have its major axis disposed to correspond to the major axis of the receiving mold.

5. In a device of the kind described, a base, a shear mechanism, and means mounting said shear mechanism upon said base comprising a frame member mounted for vertical adjustment upon the base, a plate mounted upon said frame member for adjustment in a horizontal plane, an arcuate arm mounted upon said plate for adjustment in a horizontal plane independently of said plate adjustment, and means connecting said shear mechanism to said arm for rotary adjustment.

6. In a device of the kind described, a glass discharge mechanism, a base, shears for severing glass emitted from said discharge mechanism, a forming device including a major axis adapted to receive glass discharged from said discharge mechanism, and means mounting said shears on said base for rectilinear horizontal adjustment at an angle to the major axis of the said forming device, said means including only one adjustment assemblage.

SAMUEL G. STUCKEY.